United States Patent [19]

Bhagwat et al.

[11] Patent Number: 4,835,410
[45] Date of Patent: May 30, 1989

[54] DUAL-MODE CORDED/CORDLESS SYSTEM FOR POWER-OPERATED DEVICES

[75] Inventors: Pradeep M. Bhagwat; Donald E. Elson, both of Baltimore; Richard T. Walter, Baldwin, all of Md.

[73] Assignee: Black & Decker Inc., Newark, Del.

[21] Appl. No.: 160,911

[22] Filed: Feb. 26, 1988

[51] Int. Cl.⁴ .......................... H02J 7/00; H02K 7/14
[52] U.S. Cl. ...................................... 307/64; 307/66; 310/50; 320/2
[58] Field of Search ...................... 307/64, 66, 43, 80; 310/50; 320/2

[56] References Cited

U.S. PATENT DOCUMENTS

| | | | |
|---|---|---|---|
| 2,590,805 | 3/1952 | Vitale | 307/150 |
| 2,721,946 | 10/1955 | Weisberger et al. | 307/43 |
| 3,079,510 | 2/1963 | Hartwig | 307/65 |
| 3,201,742 | 8/1965 | English | 339/58 |
| 3,550,280 | 12/1970 | Palm | 310/50 X |
| 3,769,571 | 10/1973 | Wilkinson | 307/64 X |
| 3,999,110 | 12/1976 | Ramstrom et al. | 310/50 X |
| 4,196,469 | 4/1980 | Gurwicz | 363/37 X |
| 4,227,243 | 10/1980 | Gurwicz et al. | 363/132 |
| 4,333,134 | 6/1982 | Gurwicz | 363/17 |
| 4,353,112 | 10/1982 | Rietveld et al. | 363/16 |
| 4,507,720 | 3/1985 | Colbrese | 307/67 X |
| 4,638,176 | 1/1987 | Martinelli | 307/66 X |
| 4,694,194 | 9/1987 | Hansel et al. | 307/64 X |

OTHER PUBLICATIONS

"Operating Instructions", Panasonic Omnivision VHS PV-A110.
"Operating Instructions", SONY AC Pack/Battery Charger ACP-80UC.

Primary Examiner—William M. Shoop, Jr.
Assistant Examiner—Sharon D. Logan
Attorney, Agent, or Firm—J. Bruce Hoofnagle; Edward D. Murphy; Harold Weinstein

[57] ABSTRACT

A dual-mode system for operating electrically powered devices, such as hand-held power tools and appliances, includes a cordless battery pack that supplies the power and current demands of the device in a cordless mode or a corded voltage converter that supplies the necessary power and current demands in a physical envelope commensurate in size and interchangeable with that of the battery pack. The corded voltage converter is provided with a high efficiency power supply that allows the converter to generate the power and current required by the driven device and accommodate widely varying loads consequent to normal operation of the device and do so in a physical envelope that is commensurate in size with and interchangeable with the cordless battery pack. The corded voltage converter includes a power conditioner that conditions input source current, such as 120 or 240 volts AC or DC, to provide a relatively high DC voltage that is chopped at a comparatively high frequency, e.g., 25 KHz, by switching devices. The high-frequency, high voltage current is presented to a step-down transformer with the stepped-down output rectified to provide a low-voltage DC current to a drive motor of the device.

34 Claims, 3 Drawing Sheets

DUAL-MODE CORDED/CORDLESS SYSTEM FOR POWER-OPERATED DEVICES

CROSS REFERENCE TO RELATED APPLICATION

The subject matter of the present application is related to that disclosed in co-pending and commonly assigned U.S. patent application Ser. No. 161,122, filed on even date herewith and entitled "Voltage Converter" and U.S. patent application Ser. No. 160,912 filed on even date herewith and entitled "Corded/Cordless Dual-Mode Power-Operated Device".

BACKGROUND OF THE INVENTION

The present invention relates to electrically operated devices and appliances and, more particularly, to a power-operated device which can operate in a cordless mode from a self-contained power source or in a corded mode from a conventional AC or DC power source.

Electrically-operated devices that function in a cordless mode typically include a housing having a chamber for receiving and retaining a removable, enclosed battery pack. The battery pack completely encloses one or more cells contained within the pack and provides the necessary DC power for operation of the device. Historically, cordless electrically powered devices have included relatively low-power devices such as shavers, hand-held calculators, entertainment devices, typewriters and the like, these representative devices generally having a relatively small power consumption under constant load condition.

Advances in battery technologies and systems have led to the development of physically compact and electrically efficient batteries that store a relatively large amount of electrical energy. These higher energy batteries have permitted the development of higher power cordless devices that operate at power levels above 50 watts, including power levels that extend to 500 watts or so. These higher power devices include, for example, portable hand-held power tools and appliances such as drills, screwdrivers, screwdriver-drills, hammer-drills, jig saws, circular saws, shears, hedge trimmers, and various household products and appliances. In addition to operating at much higher power levels than prior devices, these devices typically encounter widely varying load conditions during normal use. For example, an electrically driven drill bit typically encounters a lighter load condition when the workpiece is wood or plastic, in contrast to steel, and, for any particular material, the drill bit may be subjected to widely varying loads, such as those conditions which tend to bind the drill bit in the workpiece. These varying loads cause corresponding variations in the current drawn by the drive motor from the power source and subject the power source to high-current demands not typically encountered with the low-power devices.

The current state of battery pack technology is such that battery packs are available to meet both the total power requirements for the higher powered devices as well as accommodate the range of electrical current variations consequent to operation under varying load conditions.

Electrically-operated power devices of the cordless type described above permit work operations to be performed in areas where a conventional AC power source is not available, although the use of such cordless devices is limited to the effective charge life of the cells within the battery pack. When the battery pack is discharged, the battery pack must be recharged or replaced with a fully charged pack.

When the operator of a cordless-mode power-operated device, as described above, is in an area in which an external power source is available, such as a continuous AC power source or a high level DC voltage source, it is oftentimes more efficient to connect the device to the external power source by a power cord to conserve the battery charge for subsequent use in areas where the AC source or high level DC source is not available. In general, those cordless-mode devices that use a low-voltage DC motor cannot be directly driven from an AC source or from a high level DC source.

Certain design criteria are presented when attempting to drive the higher power (e.g., 50 watts or higher), low-voltage DC motors of a cordless device using a corded converter for adapting or converting the AC source or high-level DC source for the motor. The cordless battery pack represents a physical envelop that can limit the ultimate current and power providing capacity of the corded converter, since the internal electrical components and circuitry of the converter must conform to the overall physical envelop constraints. As current and power demands are increased to provide adequate energy for the higher power tools discussed above, the physical size of the electrical components required for the converter increases proportionately and tend to define a practical power and current limit for a corded converter that is designed to be interchanged with the cordless battery pack.

One low-power device, i.e., having a power consumption of between one and five watts, and which can operate in a cordless mode using a primary or secondary battery or in a corded mode using a transformer/rectifier combination is an electrical shaver of the type described in U.S. Pat. No. 3,079,510 to Hartwig. The low-power electric shaver employs a DC motor that drives the shaving head and which can be operated in a cordless mode by use of either a primary battery or a rechargeable secondary battery. The battery is mounted in an open, cup-shaped cap, is provided with a pair of U-shaped terminals on opposite sides thereof, and is positioned in the open end of the cap and partially exposed outwardly from the open end. The battery is installed by manipulating the cap to first insert the exposed portion of the battery into an opening of the shaver housing with the battery terminals effecting contact with complementary spring contacts within the housing to effect electrical connection to the DC motor within in the shaver housing. As the battery enters the housing, the spring-contacts mechanically guide the battery into its assembled position, and tongues formed within the cap snap into grooves formed in the housing to retain the cap and its battery in place.

In addition to battery operation, the shaver can be operated by a corded power adapter in the form of another open, cup-shaped cap that contains a terminal block to which one end of power cord is assembled with a conventional male plug connected at the other end of the power cord. A transformer is mounted in the open cap in a position similar to the battery mounting with portions of the transformer being exposed. The transformer is capable of transforming 110 volts or 220 volts of a low-frequency AC source current to a lower level AC voltage which is rectified to the voltage level of the DC motor. A pair of terminals are mounted on opposite sides of the transformer in position to engage the spring contacts of the housing as the cap is assembled with the housing. The primary of the transformer is connected through the terminal block to the AC source while the secondary of the transformer is connected to a rectifier mounted in the base of the cap. The output of the rectifier provides a low-voltage DC voltage at a low-power level that is sufficient to operate the electric shaver. Thus, the corded transformer-rectifier assembly within the open cap can be inserted into the housing in place of the battery-containing cap to facilitate operation of the electric shaver in a corded mode from an AC power source. The transformer-rectifier combination is designed to provide only low power in a narrow current range required to operate the electric shaver and represents a reasonable design solution. Since the shaver does not experience a wide range of loads, the transformer-rectifier combination does not have to accommodate operating loads that develop high current conditions and attendant electrical stressing of the transformer or rectifier.

Other commercially available lower power systems also employ a similar principle of substituting a converter unit within the battery compartment of a device which operates on a low DC voltage. For example, one commercially available video camera recorder operates at DC voltage levels of 8.5 volts with a power consumption of 20 watts. Another commercially available video camera recorder operates at a DC voltage level of 12 volts with a power consumption of 22 watts. Typically, each of the available camera recorders includes a facility for supporting a battery pack to provide the operating DC voltage and power. As an alternative, a corded AC pack or adaptor, which is contained in a housing with essentially the same exterior shape and terminal location as the housing of the battery pack, can be substituted for the battery pack in the camera recorder. The AC pack will then provide the operating DC voltage and power when the pack is connected to a conventional AC power source such as, for example, a 120 volts, 60 Hz wall source. These commercially available camera recorder systems also include a battery charger unit which is separate from and operates independently of the camera recorder. When using the battery charger unit, both the battery pack and the AC pack are inserted into the unit. The AC pack is then connected to a conventional AC source whereby the AC pack provides the DC voltage and power necessary to charge the batteries.

Even on those rare occasions when an overload condition occurs, the video camera recorder, as well as the shaver described above, operate at such low power levels that it is unlikely that catastrophic reactions will occur within the converters used with these types of devices. In contrast, if converters are used at higher power levels, e.g., such as 50 watts and higher, an overload condition can result in severe over-stressing of the components and attendant increased operating temperature within the converters which could destroy one or more components of the converters.

In the context of a low-power device, the transformer-rectifier combination of the shaver and the corded AC pack of the video camera recorders represent a relatively simple and appropriate solution. The physical size of low current electronic devices, including step-down transformers, rectifiers, and similar power-supply components, is such that the converter can be fabricated with a continuous power rating that is suitable for the powered device and which readily fits within the physical envelop prescribed by the battery pack. However, such a solution does not lend itself to higher power devices of the type described, especially where a wide current variation is drawn because of widely varying load conditions. For example, if the power and current demand were increased an order of magnitude or more, viz., for a power demand of 50 watts or more, a contemporary battery pack can be provided to meet both the power and current demands, even where the current varies over a wide range because of different load conditions experienced by the device. However, a higher power corded converter that follows the design approach presented in U.S. Pat. No. 3,079,510 would require disproportionately larger and heavier components, particularly the step-down transformer, with higher current carrying capacities to supply the needed power and to also accommodate the variation in current caused by the varying loads experienced by such devices. Thus in high-power devices, a practical design constraint exists with regard to the fabrication of corded AC/DC converters having the requisite power and current providing capacity in a corded converter housing that is commensurate in size with the envelop prescribed by the battery pack and which does not compromise or diminish the utility of the device. Thus, the feasibility of providing a practical corded converter that provides the power and current requirements in a physical envelope prescribed by the cordless battery pack diminishes as the power levels increase. If corded AC/DC converters using above-described design approach were applied to high-power drills, screwdrivers, screwdriver-drills, hammer-drills, jig saws, circular saws, shears, hedge trimmers, related household products and the like, the size and weight of the corded AC/DC converters, as well as the cost of such devices, would comprise the utility of the devices.

SUMMARY OF THE INVENTION

In view of the above, it is an object of the present invention, among others, to provide a system by which high power devices can be operated by a cordless battery pack or a corded converter that can provide the necessary power and current requirements of the high power device.

It is another object of the present invention to provide a system by which high power devices can be operated by a cordless battery pack or a corded converter that can provide the necessary power and current in a physical envelop commensurate with that of the cordless battery pack.

It is still another object of the present invention to provide a system by which high power devices can be operated by a cordless battery pack or a corded converter that can respond in a corrective sense to overload conditions caused by different load conditions placed on the device.

It is a further object of the present invention to provide a system by which high power devices can be operated by a cordless battery pack or a corded converter in which the weight, portability, and utility of the device is not compromised by operation in a corded mode.

In view of these objects, and others, the present invention provides a system by which higher power electrically operated devices can be operated in a corded or cordless mode. The device is provided with an interface for accepting either a cordless battery pack that supplies the power and current demands for the device in a cordless mode or a corded converter that supplies the necessary power and current demands in a physical envelop commensurate with that of the battery pack. The corded converter is provided with a high efficiency power supply that allows the converter to generate the power and current required by the driven device and accommodate widely varying loads consequent to normal operation of the device and do so in a physical envelop that is commensurate in size with and interchangeable with the cordless battery pack.

In the preferred embodiment, the cordless battery pack is designed to be removeably received with a pack receiving chamber formed in the device and interconnect with control circuitry to allow controlled operation of the device motor using power provided from the battery pack. Corded operation is achieved by substituting a corded converter for the battery pack. The corded converter includes a power conditioner that conditions input source voltage, such as 120 or 240 volts AC or DC, to provide a relatively high DC voltage that is chopped at a comparatively high frequency, e.g., 25 KHz, by switching devices. The high-frequency, high voltage current is presented to a step-down transformer with the stepped-down output rectified to provide a low-voltage DC current to the drive motor.

The present invention advantageously provides a dual-mode system for the cordless or corded operation of a higher power device in which the corded converter is provided with a high efficiency converter circuitry that allows a corded converter that successfully meets the total power and current demands of the device in a physical envelop commensurate in size and interchangeable with the battery pack used during cordless operation.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figures 1, 2:
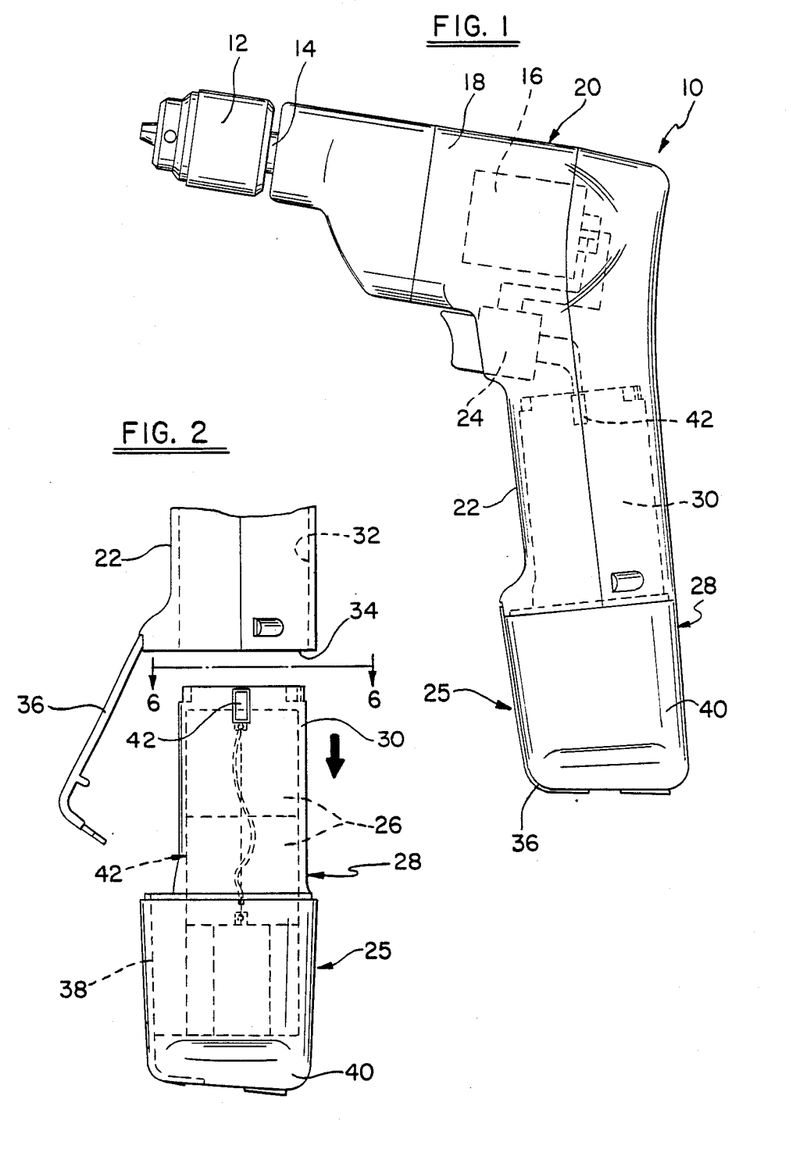
FIG. 1 is a side elevational view of a cordless electric having a battery pack received within a chamber of a handle portion of the drill.
FIG. 2 is a partial side elevational view showing the handle portion of the electric drill of FIG. 1 with the battery pack removed from its receiving chamber.

A high-power corded/cordless system for power-operated devices in accordance with the present invention is shown in FIGS. 1-7 in the form of an electric drill, designated generally by the reference character 10. As shown in FIG. 1, the drill 10 includes a chuck 12 secured to a rotatable spindle 14 which is driven through a gear train (not shown) by an electric motor 16 (shown in dotted line illustration) in the conventional manner. The motor 16 is mounted in a motor casing 18 of a housing 20 that includes a handle 22 depending therefrom. A trigger switch 24 is mounted in the handle 22 immediately below the motor casing 18 and is actuated in the usual manner to operate the drill 10. In FIG. 1, a battery pack, indicated generally by the reference character 25, is installed within the handle 22 as explained below and provides electrical current to the motor 16 in response to actuation of the trigger switch 24.

As illustrated in FIG. 2, the battery pack 25 includes a plurality of cells 26 (phantom line illustration) housed within a battery-pack container 28. A first section 30 of the container 28 is shaped externally to fit within a chamber 32 formed within handle 22. The chamber 32 is formed with an open end 34 to facilitate insertion of the first section 30 of the container 28 into the chamber 32. A latch member 36 is connected in a hinged fashion to the handle 22 adjacent one side of the open end 34. After the first section 30 of the container 28 has been inserted fully into the chamber 32, as shown in FIG. 1, the latch member 36 is pivoted into a nest 38, as shown in the cross-section view of FIG. 3, of a second section 40 of the container 28. The latch member 36 engages a latching mechanism 41 that is part of the handle 22. In the preferred embodiment, the latching function is achieved in accordance with that presented in U.S. Pat. No. 3,999,110, issued to Ramstrom et al. on Dec. 21, 1976, the disclosure of which is incorporated herein by reference.

The cells 26 are arranged and connected within the battery pack 25 to provide a low-level DC voltage compatible with the operating DC voltage supply level of the motor 16, for example, 12 volts. This voltage supply level is normally associated with a cordless mode of operation for a power-operated device, such as the drill 10, although the voltage supply level could be in a range of 3.6 to 48 volts DC without departing from the spirit and scope of the invention.

Figures 3, 4, 5, 6:
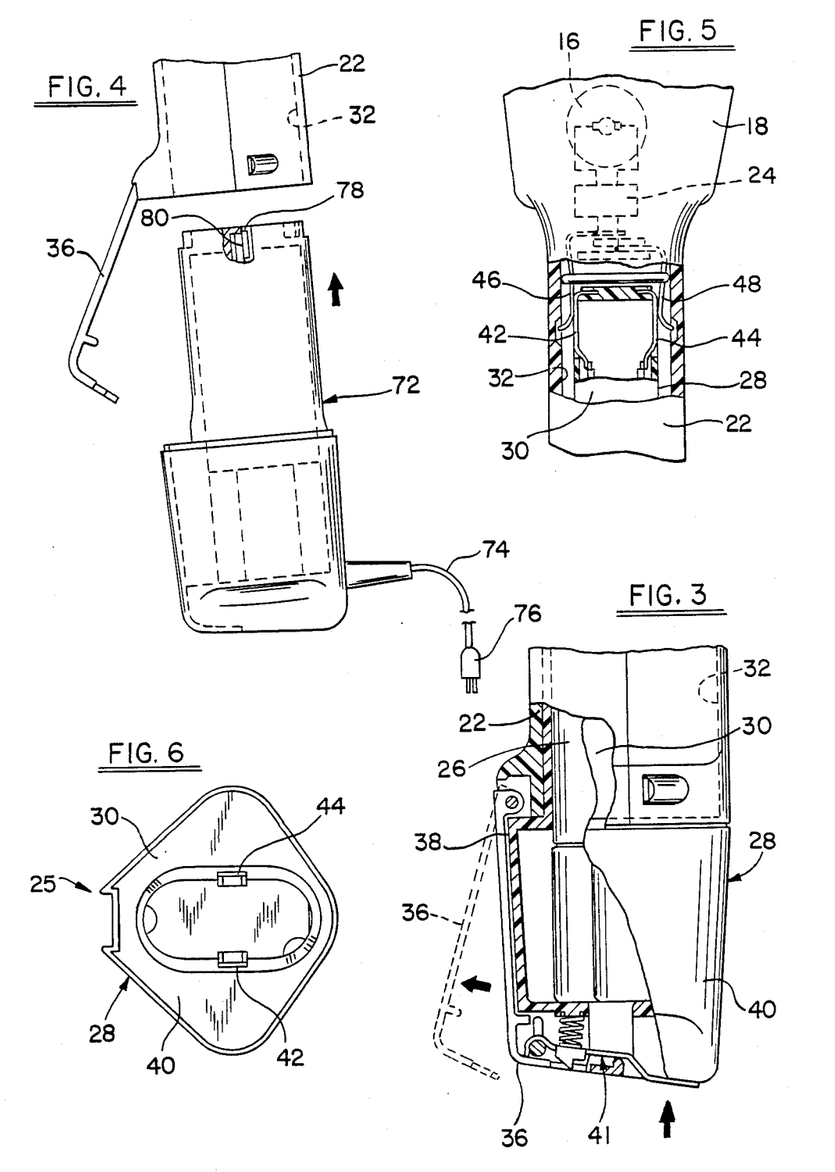
FIG. 3 is a partial side elevational view, similar to FIG. 2, showing the handle portion of the electric drill of FIG. 1 with the battery pack installed in its receiving chamber and latched into place.
FIG. 4 is a side elevation view partially showing the handle portion of the electric drill of FIG. 1 with a container for housing a power converter in which the container is positioned for insertion into the chamber of the handle portion.
FIG. 5 is a rear elevational view partially showing the electric drill of FIG. 1, with a portion broken away, to reveal the manner of electrically connecting either the battery container of FIGS. 1-3 or the power converter container of FIG. 4 to an electric motor contained within the drill.
FIG. 6 is a top plan view, taken along line 5—5 of FIG. 2, showing the top of the battery pack of FIGS. 2-3.

The cells 26 are connected internally within the battery pack 25 to a pair of output contacts or terminals 42 and 44, as best shown in the top view of FIG. 6, located on opposite sides of the section 30 at the proximate end of the container 28. As shown in FIG. 5, input contacts in the form of wire strap contacts 46 and 48 are mounted internally of the handle 22 and are positioned to engage the terminals 42 and 44, respectively, as the first section 30 of the container 28 is inserted into the chamber 32 of the handle 22. The input contacts 46 and 48 are connected through internal wiring to the switch 24 which, in turn, is connected through wiring to the motor 16. When the switch 24 is closed by an operator, energy is applied by the cells 26 to the motor 16 to operate the drill 10.

A cordless power-operated device, such as the drill 10, is lightweight, is easily manipulated by the operator, and is designed for portable utility. While such a device is useful in any work area, it has particular utility in work areas where conventional power sources are not available. The drill 10, for example, can be operated in such work areas by use of the low-level DC voltage available from the cells 26 and will typically operate in a power range of, for example, 50 watts and higher. While this demonstrates the clear advantage of such cordless devices, the cells 26 have a limited charge life and must be periodically recharged. Consequently, it is desirable to conserve the charge of the cells 26 whenever a conventional AC power source is available in the work area. However, cordless devices, such as the drill 10, operate on a low-level DC voltage such as, for example, 12 volts. Typically, the AC source provides 120 volts at 60 Hz. in the United States and other values outside the United States, for example, 220/240 volts at 50 Hz, which values are unsuitable for direct operation of the cordless device.

Figure 7:
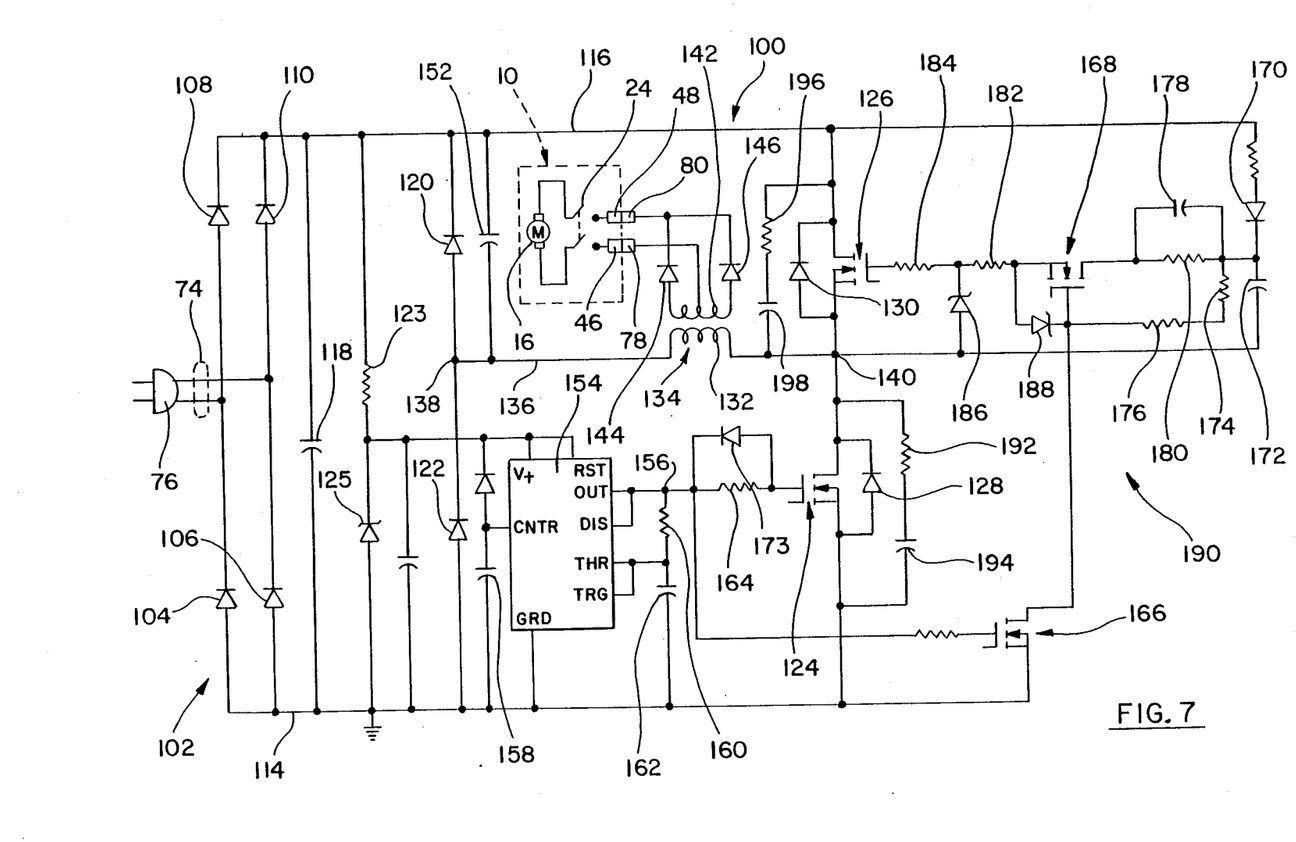
FIG. 7 is a schematic of a voltage converter assembled and contained within the container of FIG. 4 in accordance with the present invention.

In the preferred embodiment of this invention, a corded converter 100, as illustrated in circuit diagram form in FIG. 7, is housed within a container 72 which, as illustrated in FIG. 4, is insertable into the chamber 32 in a manner analogous to the battery pack 25. The container 72 has an exterior envelop that is substantially identical to the container 28 (FIG. 1) and is received within the chamber 32 of the handle 22 for assembly with the drill 10. A power cord 74 and plug 76 extend from the container 72 to facilitate connection of the power converter 100 to an external power source. The power converter 100 includes a pair of output terminals 78 and 80 (FIG. 4) that correspond in position and function to the terminals 42 and 44 (FIGS. 2 and 6) of the container 28.

The power converter 100 is described in the afore-referenced U.S. patent application Ser. No. (Black & Decker Case 4787), filed on even date herewith and entitled "Voltage Converter," the disclosure of which is incorporated herein by reference thereto. The converter 100 is designed to convert either a high AC voltage, or a high level DC voltage, to a lower level DC voltage. For example, the converter 100 can convert an input of 120 volts, 60 Hz AC to any low-level DC voltage required by the motor 16 such as, for example, 12 volts or 24 volts DC. In addition, the converter 100 can convert a high-level DC voltage to a low-level DC voltage, for example, 150 volts DC to 12 volts DC.

As illustrated in FIG. 7, the voltage converter 100 includes a bridge rectifier 102 formed by diodes 104, 106, 108, and 110. The plug 76 is connected to the bridge rectifier 102 and is connectable to a conventional AC source, which supplies, for example, 120 volts at 60 Hz. In this instance, the AC source functions as a primary power source for the voltage converter 100. The output of the rectifier 102 is applied between a ground reference line 114 and a line 116. The rectified output is filtered by a capacitor 118 to thereby provide 150 volts DC between the lines 114 and 116. As an alternate to the AC power source, the lines 114 and 116 can be connected directly to a DC voltage source of 150 volts that would then be converted to the low voltage required for the drill 10.

A pair of oscillation damping diodes 120 and 122 are connected in series between the lines 114 and 116. A voltage dropping resistor 123 and a voltage-establishing Zener diode 125 also are connected in series between the lines 114 and 116.

The source and drain electrodes of a pair of N-channel power MOS field effect transistors 124 and 126 are connected in series between the lines 114 and 116 in the manner illustrated in FIG. 7. The transistors 124 and 126 function as voltage sensitive devices and develop capacitive charges during operation. Intrinsic diodes 128 and 130 are representative of the diode structure that is inherently formed as an integral and physical part of the transistors 124 and 126, respectively, and are connected in parallel with the source and drain electrodes of the transistors 124 and 126. One side of a primary winding 132 of a high frequency, step-down transformer 134 is connected through a line 136 to a node 138 between the diodes 120 and 122. The other side of the primary winding 132 is connected to a node 140 between the drain electrode of the transistor 124 and the source electrode of the transistor 126.

The outside terminals of a center-tapped secondary winding 142 of the transformer 134 are connected to the anodes of rectifier diodes 144 and 146. The cathodes of diodes 144 and 146 are each connected to the output terminal 80 of the voltage converter 100 while the center tap of secondary winding 142 is connected to the output terminal 78. As discussed above in connection with FIG. 5, the terminals 80 and 78 are connected, respectively, to input contacts 46 and 48 of the drill 10.

During operation of the voltage converter 100 as illustrated in FIG. 7, AC voltage is applied to the converter 100 through the plug 76 with the bridge rectifier 102 developing a pulsating DC voltage between the ground reference line 114 and the line 116. The pulsating DC voltage is filtered by the capacitor 118 to provide, for example, 150 volts DC between the lines 114 and 116 with an input of 120 volts AC at a frequency of 60 Hz. A DC voltage is developed across the Zener diode 125 which is applied to and facilitates operation of an oscillator 154 that operates at a frequency of 25 KHz, that is, a rate between 350 and 600 times the input AC frequency, and produces an alternating voltage in the form of a square wave which appears at the node 156. The oscillator 154 includes a CMOS astable RC timer defined by a self-contained chip, for example, of the type identified as an ICM 7555 chip available from Intersil, Inc. of Cupertino, CA 95014. During initial operation of the voltage converter 100, the capacitor 158 provides a soft start for the oscillator 154 which permits the capacitor 152 to gradually charge from zero volts to a desired peak level. An RC network, including a resistor 160 and a capacitor 162, is connected to the oscillator 154, as illustrated in FIG. 7, and establishes the frequency of operation of the oscillator 154 and the voltage converter 100.

During one half cycle of each square wave output of the oscillator 154, the output at the node 156 is high and is applied through a resistor 164 to the gate electrode of the transistor 124 to bias the transistor to its ON state. Current then flows in a first or charging direction through a capacitor 152, through the primary winding 132 and through the source and drain electrodes of the transistor 124. During this half cycle of each square wave, the AC source and the rectified and filtered output thereof functions as a primary power source for the transformer 134. As current flows in the first or charging direction through the primary winding 132, a voltage is induced in the secondary winding 142. The output of the transformer 134 is rectified by the diodes 144 and 146 and is applied through the output terminals 78 and 80 to the input contacts 46 and 48, respectively, of the drill 10. If the switch 24 is closed, operating power is applied to the motor 16 to operate the drill 10. Also, during this half cycle of operation, when current flows in the first or charging direction, the capacitor 152 charges to a specific voltage level.

When the output of the oscillator 154 is high, during this half cycle of each square wave, a N-channel power MOS field effect transistor 166 is biased to its ON state and, through its drain and source electrodes, connects the ground reference line 114 to the gate electrode of a N-channel power MOS field effect transistor 168. The transistors 166 and 168 also function as voltage sensitive devices and develop a capacitive charge during operation. The connection of the ground reference line114 to the gate electrode of the transistor 168 insures that the transistor 168 and the transistor 126 will not turn ON when the transistor 124 is in its ON state. When the transistor 124 is turned ON, a charging path is formed that includes a diode 170, a capacitor 172, and the source and drain electrodes of the transistor 124 to charge the capacitor 172 essentially to the voltage level appearing between the lines 114 and 116.

During the next half cycle of each square wave output of the oscillator 154, the output of the oscillator 154 goes low and the transistors 124 and 166 are biased to their OFF state to disconnect the ground reference line 114 from the gate electrode of the transistor 168. At this time, the transistor 124 then quickly discharges through a diode 173 that is connected in parallel with the resistor 164. Also, the charging path for the capacitor 172 is opened, and the capacitor 172 is precluded from discharging through the charging path by the inverse connection of the diode 170. At this time, the capacitor 172 begins to discharge slowly through a path which includes gating resistors 174 and 176, and the gate and source electrodes of the transistor 168. The resultant current flow through the gate-source circuit of the transistor 168 causes the transistor 168 to turn ON. The capacitor 172 then begins to discharge more rapidly through a path which includes a parallel combination of a capacitor 178 and a resistor 180, the source and drain electrodes of the transistor 168, a pair of current limiting resistors 182 and 184, and the gate and source electrodes of the transistor 126.

The capacitor 178 is a very low-valued capacitor while the resistor 180 is of a relatively high resistance value. This combination of RC values permits rapid current flow initially through the capacitor 178 until the low-valued capacitor is nearly fully charged after which current flows more slowly through the resistor 180. The initial rapid current flow through the discharge path of the capacitor 172, which includes the capacitor 178 and the transistor 126, causes the transistor 168 to turn ON rapidly. A Zener diode 186 is designed to break down at the operating voltage level of the transistor 126 and thereby prevents any potentially harmful application of voltage to the transistor 126 above the operating voltage level.

Thus, the capacitor 172 functions as a tertiary power source for the converter 100 and powers the operation of the transistor 126. With respect to the charging of the capacitor 172, the transistors 124 and 166, and the components in the charging path of the capacitor function as a means for facilitating the development of the voltage of the tertiary power source. Further, the shut down of the transistor 166, the turn ON of the transistor 168, and all of the components associated with the discharge of the capacitor 172 form a means for applying the voltage of the tertiary power source, i.e., the capacitor 172, to turn ON the transistor 126. The transistor 126 will remain in its ON state until the transistor 166 is again turned ON and the ground reference line 114 is connected thereby to the gate electrode of the transistor 168. At this time, the capacitor 172 begins to charge as described above and the transistor 126 begins to discharge. The discharge path for the transistor 126 includes the resistors 182 and 184, a Zener diode 188, and the source and drain electrodes of the now-conducting transistors 124 and 166. The Zener diode 188 insures that the discharging current of the transistor 126 will not flow through the gate-source circuit of the transistor 168 and thereby prevents potential damage to the transistor 168.

The transistors 166 and 168, along with the other elements in the biasing control circuit for the transistor 126, form a power buffer, indicated generally by the reference character 190. Thus, while the bias control for the operation of the transistor 124 is derived directly through the oscillator 154, the bias control for the operation of the transistor 126 is derived indirectly through the oscillator 154 and directly through the power buffer 190 which includes a tertiary or separate power source, namely, the charged capacitor 172.

During the next half cycle of each square wave output of the oscillator 154, when the output is low, the transistor 124 is turned OFF and the transistor 126 is turned ON. In this mode, the primary winding 132 is now connected in a closed series loop which includes the source and drain electrodes of the transistor 126 and the capacitor 152. At this time, the capacitor 152 begins to discharge to supply current in the closed series loop. This current flows in a second or discharging direction through the primary winding 132 of the transformer 134, which is in a direction opposite to that when the transistor 124 was conducting. In this mode, then, the capacitor 152 functions as a secondary power source for the transformer 134 whereby a voltage is induced in the secondary winding 142. During this period, the output of the transformer 134 is rectified by the diodes 144 and 146 and is applied through the output terminals 78 and 80 and to the input terminals 46 and 48, respectively, of the drill 10. Assuming the switch 24 is closed, operating power is applied to the motor 16 to operate the drill 10, as discussed above.

Thus, during alternate operation of the transistors 124 and 126 and during successive half-cycles of the square wave output of the oscillator 154, current flows alternately in opposite directions through the primary winding 132 at a relatively high frequency determined solely by the frequency of the oscillator 154 of the sensing and control circuit. The use of the voltage converter 100 operating at a high-frequency, e.g., 25 KHz, allows the use of physically compact and lightweight components, especially voltage converting transformers. Thus, the converter 100 can be contained within a physical envelop such as the container 72 (FIG. 4) which is commensurate with that of the battery pack 2 and yet provides the high power and current required to operate the drill 10 without compromising the utility thereof.

As noted above, 150 volts DC appears between the lines 114 and 116. During the conduction of the transistor 124, the voltage between the lines 114 and 116 is effectively split between the primary winding 132 and the capacitor 152 whereby the capacitor charges, theoretically, to a level of 75 volts. The remaining 75 volts is applied across the primary winding 132 which voltage is then stepped down in value by the split secondary winding 142. The secondary winding voltage is further rectified, as noted above, by the diodes 144 and 146 to provide a low-level DC voltage, for example, 12 volts, which is applied to the output terminals 78 and 80 of the drill 10.

During the mode when the transistor 126 is conducting, the capacitor 152 is the power source for the transformer 134. Since the capacitor 152 has been charged to a level of 75 volts during the previous half cycle of the square wave output of the oscillator 154, this voltage level is effectively applied to the primary winding 132 and is the same voltage level applied to the primary winding during the previous half cycle.

Thus, the same level of voltage, but of opposite polarity, is applied to the primary winding 132 during alternate half cycles of the square wave output of the oscillator 154. In this manner, a high frequency signal is applied to the primary winding 132 which is stepped-down by the transformer 134 and rectified by the diodes 144 and 146 to provide the desired low-level DC voltage at the output terminals 78 and 80.

A resistor 192 and a capacitor 194 are connected in parallel with the source and drain electrodes of the transistor 124 and function as a snubber circuit to provide a bypass around the transistor 124 for any spurious voltage spikes which may occur and which could possibly damage the transistor 124. Similarly, a resistor 196 and a capacitor 198 are connected in parallel with the source and drain electrodes of the transistor 126 and function as a snubber circuit for the transistor 126.

If an overcurrent situation occurs in the output of the transformer 134 when the transistor 124 is ON, e.g., a short-circuit or overload condition in the motor 16, the inductive impedance of the transformer 134 becomes extremely small and the capacitor 152 will charge quickly to the level of the supply voltage (150 volts) between the lines 114 and 116. The magnitude of the field about the inductive circuit presented by the transformer 134 under these conditions is significantly large and seeks to keep the current flowing in the same direction by virtue of the stored energy in the magnetic field. Normally, this condition would cause the capacitor 152 to charge to an even higher voltage level and would start the circuit into an undesirable oscillation mode, thereby saturating the transformer 134.

In order to prevent this overload induced oscillation with the transistor 124 biased to its ON state, the current resulting from the stored energy of the magnetic field of the inductive circuit of the transformer 134 is directed through a loop which includes the drain and the source electrodes of the transistor 124, a diode 122, and the primary winding 132 of the transformer 134. The resulting current continues in this loop until the field has completely dissipated. During this time, the charge on the capacitor 152 remains at the supply voltage level (150 volts) and any tendency for oscillations are damped to preclude any catastrophic event during the period when the transistor 124 is in its ON state.

When the transistor 124 is switched to its OFF state and the transistor 126 is switched to its ON state during the overload or short circuit condition, the capacitor 152 is now in a closed loop with the transformer inductance and the drain and source electrodes of the transistor 126. The capacitor 152 remains charged to the level of the previous charge (150 volts) which is the charge achieved during the period when the transistor 124 was in its ON state. Due to the low impedance in the inductive circuit of the transformer 134, the previously charged capacitor 152 discharges rapidly through the low impedance to essentially zero volts. As the capacitor 152 discharges rapidly, a magnetic field is developed rapidly about the transformer inductance. When the capacitor 152 is fully discharged, the stored energy of the field about the transformer 134 tends to maintain current flow in the same direction as when the capacitor 152 was discharging; the continued current flow normally charging the capacitor 152 in the negative direction. With the capacitor 152 charged in the negative direction, the power supply and the negative charge on the capacitor 152 would then be in a cumulative arrangement to provide a total voltage which greatly exceeds 150 volts when the transistor 124 is again biased to its ON state.

This condition would again lead to a catastrophic event because of the significant voltage level which would lead to the saturation of the transformer 134 and the resultant destruction of circuit components. A diode 120 is connected in a parallel circuit with the capacitor 152 to preclude the reverse charging of the capacitor 152. After the capacitor 152 has been fully discharged, the current resulting rom the stored energy of the magnetic field of the transformer 134 will seek the least-impedance path and pass through the diode 120 to bypass the capacitor 152. Eventually, the stored energy is fully dissipated and a steady-state condition attained for the remainder of the period when the transistor 126 is in its ON state.

Thus, by connecting the diodes 120 and 122 in the voltage converter 100, undesirable oscillations in the converter 100 are precluded when a short circuit or overload occurs in any load, such as the motor 16 connected to the output of the transformer 134.

The converter 100 initially converts the low frequency input to a high level DC voltage, then to a high frequency voltage level which is thereafter effectively transformed and rectified to the lower voltage supply level of the drill 10. The transformer 34 is a high frequency transformer which is lightweight and compact, particularly when compared with the weight and size of a transformer used in low frequency applications such as, for example, at 50 Hz or 60 Hz.

In addition, the converter 100 is designed with a comparatively small number of components while providing an efficient conversion process. This further enhances the lightweight, compact features of the converter 100. The size of the converter 100 further permits the use of such a compact converter in power-operated devices, such as the drill 10, which heretofore were too small to support and contain conversion units providing power in a range of at least 50 watts and higher.

Further, while the preferred embodiment of the converter 100 converts a low frequency, high voltage level to a low DC voltage level, the converter can be used to convert a high DC voltage level to a low voltage DC level b applying the high DC level directly to an output side of the rectifier of the power input circuit 102. From that point, converter 100 would function in the manner described above to provide for the DC to DC conversion. Therefore, converter 100 could be arranged in the container 72 (FIG. 4) so that the converter could be connected directly to a high DC voltage source as an external power source. In this manner, the drill 10 could be operated from the high DC voltage source instead of the low DC voltage of the cells 26 and thereby conserve the charge life of the cells.

The converter 100 could be designed to operate from external AC power sources other than 120 volts at 60 Hz. Without departing from the spirit and scope of the invention, the converter 100 also could be designed to provide DC output voltage levels in a range of 3.6 to 48 volts. In a particular example, the transformer 134 could be connected to provide transformation to develop a DC output of 24 volts between the output lines 114 and 116 derived from an external AC source of 220 volts at 50 Hz as applied to the power input circuit 102. The converter 100 could then be used with the container 72 to provide the dual mode capability for power-operated devices which operate at a DC voltage supply level of 24 volts.

The drill 10 is merely illustrative of one example of many power-operated, cordless-mode devices which become more versatile because of the inventive dual mode capability. Other examples of power-operated cordless devices which are enhanced by the inventive dual mode capability include, but are not limited to, screwdrivers, screwdriver-drills, hammer drills, jig saws, circular saws, hedge trimmers, grass shears, as well as battery-operated household products and the like.

Use of the converter 100 within the container 72 (FIG. 4) permits interchangeability of power sources for cordless-mode power-operated devices, such as the drill 10, so that such devices can operate in either a cordless mode or a corded mode. The lightweight and compact features of the converter 100 facilitate the containment of the relatively few components of the converter within the container 72. This permits ready replacement of cordless battery-pack container 28 with the converter container 72 and thereby permits the drill 10 to obtain dual power mode capability while retaining portability and lightweight characteristics normally associated with a cordless device such as the drill. Further, the converter 100 is contained and enclosed within the container 72 to protect the components of the converter and to shield an operator protectively from the converter. Also, the converter 100 and the container 72 provide facility for operating power-operated devices in a power range of 50 watts and higher with a preferred operating level of 50 watts.

Thus it will be appreciated from the above that as a result of the present invention, a dual-mode corded/cordless system for power-operated devices is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A corded/cordless system for power-operated apparatus, comprising:
   an electrically power-operated device operable in a preselected voltage range;
   means defining an interface for electrically and mechanically mating said device with one of a plurality of electric-power supply devices, said interface means defining a pre-determined physical envelop configuration for mechanically mating with the power supply devices;
   first supply means defining a cordless electric-power supply device for electrically and mechanically mating with said power-operated device through said interface, said cordless electric-power supply device containing cells capable of providing 50 or more watts of power in the selected voltage range to said power-operated device;
   second supply means defining a corded electric-power supply device for electrically and mechanically mating with said power-operated device, said corded electric-power supply device having a power cord for connection to a source of electrical energy therethrough and containing an electrical power converter for converting the source electrical energy to 50 or more watts of power in the selected voltage range; and
   wherein said second supply means comprises voltage converter means for converting the source electrical energy into an alternating voltage of a selected frequency and converting the alternating voltage to a lower rectified voltage in the selected voltage range.

2. The system of claim 1, wherein the power-operated device includes a motor.

3. The system of claim 1, wherein said interface means further comprises means defining a cavity having the pre-determined physical envelop configuration for accepting either of said first supply means and said second supply means.

4. The system of claim 3, wherein said interface means further comprises means defining electrical contacts positioned within said cavity for effecting electrical connection with complementary contacts on either of said first supply means and said second supply means.

5. The system of claim 1, wherein said interface means further comprises means for releasably securing either of said first supply means and said second supply means.

6. The system of claim 1, wherein said voltage converter means comprises:
   means for converting a first-frequency alternating source voltage of the source electrical energy into a second-frequency alternating voltage at the selected frequency and for converting the second-frequency alternating voltage to the lower rectified voltage in the secreted voltage range.

7. The system of claim 1, wherein said voltage converter means comprises:
   means for converting a first-frequency alternating source voltage of the source electrical energy to a DC voltage, for converting the DC voltage to a second-frequency alternating voltage at the selected frequency, and for converting the second-frequency alternating voltage to the lower rectified voltage in the selected voltage range.

8. The system of claim 4, wherein said voltage converter means further comprises:
   a step-down transformer for stepping down the voltage of the second-frequency alternating voltage.

9. The system of claim 6, wherein the frequency of the second-frequency alternating voltage is between 350 and 600 times the frequency of the first-frequency alternating source voltage.

10. The system of claim 9, wherein the second frequency is approximately 25 KHz.

11. The system of claim 6, wherein the first frequency is between 50 and 60 Hz.

12. The system of claim 6, wherein said voltage converter means further comprises:
means for rectifying the stepped down second-frequency alternating voltage of said step-down transformer.

13. The system of claim 6, wherein said voltage converter means further comprises:
means for rectifying the stepped down second-frequency alternating voltage of said step-down transformer to provide a rectified voltage of between 3.6 and 48 volts.

14. A power-operated device, comprising:
a housing having a device therein operable in a preselected voltage range;
means defining an interface for electrically and mechanically mating said housing with any one of a plurality of electric-power supply devices, the interface means defining a pre-determined physical envelope configuration for mechanically mating with the power supply devices;
supply means defining a corded electric-power supply device for electrically and mechanically mating with said housing through said interface means, said corded electric-power supply having a power cord for connection to a source of electrical energy therethrough and containing an electrical voltage converter for converting current of the source of electrical energy to 50 or more watts of power in the preselected voltage range; and
wherein said voltage converter includes means for converting a first-frequency alternating source voltage of the source of electrical energy into a second-frequency alternating voltage and for converting the second-frequency alternating voltage to a lower rectified voltage in the preselected voltage range.

15. The power-operated device of claim 14 wherein said device within said housing is a motor.

16. The power-operated device of claim 14, wherein said interface means further comprises means defining a chamber having the pre-determined physical envelop configuration for accepting said supply means.

17. The power-operated device of claim 16, wherein said interface means further comprises means defining electrical contacts positioned within said chamber for effecting electrical connection with complementary contacts on said supply means.

18. The power-operated device of claim 16, wherein said interface means further comprises means for releasably securing said supply means in its mated position.

19. The power-operated device of claim 14, wherein said voltage converter comprises:
means for converting the first-frequency alternating source voltage to a DC voltage and for converting the DC voltage to the second-frequency alternating voltage.

20. The power-operated device of claim 14, further comprising:
a step-down transformer for stepping down the voltage of the second-frequency alternating voltage.

21. The power-operated device of claim 14, wherein the frequency of the second-frequency alternating voltage is between 350 and 600 times the frequency of the first-frequency alternating source voltage.

22. The power-operated device of claim 21, wherein the second frequency is approximately 25 KHz.

23. The power-operated device of claim 14, wherein the first frequency is between 50 and 60 Hz.

24. The power-operated device of claim 20, further comprising:
means for rectifying the stepped down second-frequency alternating voltage of said step-down transformer.

25. The power-operated device of claim 22, further comprising:
means for rectifying the stepped down second-frequency alternating voltage of said step-down transformer to provide a rectified voltage of between 3.6 and 48 volts.

26. A corded power-supply device for mechanical and electrical connection with a power-operated device operated in a selected voltage range and an interface that defines a physical envelop configuration for accepting electric power-supply devices, comprising:
voltage converter means for converting the source electrical energy provided from an electrical energy source by a power cord into an alternating voltage of a selected frequency and converting the alternating voltage to a lower rectified voltage in the selected voltage range at a power of 50 or more watts;
means defining a housing for containing said voltage converter means and having a physical envelop configuration that complements that of the interface of the power-operated device to effect electrical and mechanical connection therewith; and
wherein said voltage converter means comprises means for converting a first-frequency alternating source voltage of the electrical energy source into a second-frequency alternating voltage at the selected frequency and for converting the second-frequency alternating voltage to the lower rectified voltage in the selected voltage range.

27. The corded power-supply device of claim 26, wherein said voltage converter means comprises means for converting the first-frequency alternating source voltage to a DC voltage and for converting the DC voltage to the second-frequency alternating voltage.

28. The corded power-supply device of claim 26, wherein said voltage converter means further comprises:
a step-down transformer for stepping down the voltage of the second-frequency alternating voltage.

29. The corded power-supply device of claim 26, wherein the frequency of the second-frequency alternating voltage is between 350 and 600 times the frequency of the first-frequency alternating source voltage.

30. The corded power-supply device of claim 28, wherein the second frequency is approximately 25 KHz.

31. The corded power-supply device of claim 26, wherein the first frequency is between 50 and 60 Hz.

32. The corded power-supply device of claim 25, further comprising:
means for rectifying the stepped down second-frequency alternating voltage of said step-down transformer.

33. The corded power-supply device of claim 27, further comprising:
means for rectifying the stepped down second-frequency alternating voltage of said step-down transformer to provide a rectified voltage of between 3.6 and 48 volts.

34. The corded power-supply device of claim 26 wherein the power operated device includes a motor.

* * * * *